United States Patent [19]

Sonoda et al.

[11] 4,168,355

[45] Sep. 18, 1979

[54] PROCESS FOR PRODUCING ETHYLENE POLYMERS IN TUBULAR REACTOR

[75] Inventors: Ryuichi Sonoda, Niihama; Mitsuru Tamura; Hikaru Nagashima, both of Ichihara, all of Japan

[73] Assignee: Sumitomo Chemical Company Limited, Osaka, Japan

[21] Appl. No.: 559,368

[22] Filed: Mar. 17, 1975

[30] Foreign Application Priority Data

Mar. 29, 1974 [JP] Japan ................................. 49/36431

[51] Int. Cl.$^2$ ..................... C08F 10/02; C08F 4/28; C08F 4/34; C08F 4/04
[52] U.S. Cl. ........................................ 526/64; 526/88; 526/352.2
[58] Field of Search ...................... 260/94.9 R, 94.9 P, 260/87.3, 86.7; 526/64

[56] References Cited

U.S. PATENT DOCUMENTS

| | | | |
|---|---|---|---|
| 3,201,380 | 8/1965 | Schmidt-Thomee et al. | 260/94.9 R |
| 3,293,233 | 12/1966 | Erchak, Jr. et al. | 260/94.9 R |
| 3,317,504 | 5/1967 | Kinkel et al. | 260/94.9 R |
| 3,334,081 | 8/1967 | Madgwick et al. | 260/94.9 R |
| 3,373,148 | 3/1968 | Mackie et al. | 260/94.9 R |
| 3,628,918 | 12/1971 | Beals et al. | 260/94.9 P |
| 3,654,253 | 4/1972 | Steigerwald et al. | 260/94.9 R |
| 3,702,845 | 11/1972 | Steigerwald et al. | 260/94.9 R |
| 3,714,135 | 1/1973 | Pfannmueller et al. | 260/94.9 R |
| 3,842,060 | 10/1974 | McDonald et al. | 260/94.9 P |

FOREIGN PATENT DOCUMENTS 1952693 6/1970 Fed. Rep. of Germany ..... 260/94.9 R

OTHER PUBLICATIONS

Albright, L. F., "High-Pressure Processes for Polymerizing Ethylene", *Chemical Engineering*, Dec. 19, 1966, pp. 113–120.

*Primary Examiner*—Alan Holler
*Attorney, Agent, or Firm*—Stevens, Davis, Miller & Mosher

[57] ABSTRACT

A continuous process for producing polyethylene or copolymers of ethylene with other copolymerizable compounds at a pressure of at least 1,000 kg/cm$^2$ in a tubular reactor under steady conditions without imposing on the polymerization system flow pulses, while keeping the monomer conversion at 35% or lower and the melt index of the polymer at 0.1 or more.

4 Claims, No Drawings

PROCESS FOR PRODUCING ETHYLENE POLYMERS IN TUBULAR REACTOR

This invention relates to a continuous process for producing ethylene polymers by use of a tubular reactor. More particularly, it relates to a process for producing polyethylene or copolymers of ethylene with other copolymerizable compounds continuously and steadily in a tubular reactor at a pressure of at least 1,000 kg/cm² without imposing flow pulses on the polymerization system.

As has been disclosed in Japanese Patent Publication Nos. 3,026/65, 3,027/65, 13,068/65, 20,917/70, and 18,642/72, and U.S. Patent No. 2,852,501, it is known to be a general practice in producing polyethylene by a high pressure process by use of a tubular reactor to impose on the polymerization system flow pulses by means of a so-called flow pulse generating equipment which generates properly controlled flow pulses in order to prevent an increase in pressure drop in the reactor, the clogging of the reactor with the polymer formed and the incidence of abnormal reactions in the polymerization system.

The flow pulses are generally induced by suddenly and momentarily releasing the polymerization pressure at programmed intervals whereby the polymerization can be carried out continuously.

The polymerization technique as outlined above, however, is subject to the following grave disadvantages:

(1) disturbance in the reaction temperature and in temperature control caused by the sudden change in polymerization pressure, (2) fluctuation and deterioration in the product quality associated with (1), (3) damage to equipment and fatigue of the construction material of equipment caused by the sudden and repeated change in pressure, and (4) increase in investment and in the maintenance cost.

There is no doubt, therefore, that it is desirable to obtain a polymer of constant quality by a process which permits the polymerization to proceed in steady state in a tubular reactor without imposing flow pulses.

Thus, attempts have been made to produce polyethylene in a tubular reactor without using the pulsation technique. For example, Dutch Patent Application Laid-Open No. 7,201,394 proposed a method which utilizes a tubular reactor composed of two successive polymerization sections having different diameters in order to discharge the contents physically.

This method necessitates reconstruction of the conventional reactor, and even if the reconstruction was made, the modified reactor was found unsatisfactory in achieving the intended object, because no attention had been paid to the fluid properties of the reaction mixture.

The present inventors conducted extensive studies to find a method for producing polyethylene in a tubular reactor where polymerization proceeds without imposing flow pulses and, as a result, found that continuous production of a polymer of constant quality is possible in a conventional tubular reactor without such variation in diameter as described in the aforesaid Dutch Patent Application Laid-Open No. 7,201,394. Based on this finding, the present invention has now been accomplished.

An object of this invention is to provide a novel process for continuously producing polyethylene or copolymers of ethylene with other copolymerizable compounds in a tubular reactor wherein no pulsation is imposed on the reaction mixture.

Other objects and advantages of the invention will become apparent from the following description.

According to this invention, there is provided a continuous process for producing polyethylene or copolymers of ethylene with other copolymerizable compounds by polymerizing or copolymerizing ethylene or ethylene and a compound copolymerizable with ethylene in the presence of an initiator in a tubular reactor, which process is characterized by maintaining the temperature and pressure at any point in the entire reaction zone within a definite range so as to meet the relations expressed by the formula, $$\gamma = P_G + 2T_G \geq 1850,$$

provided that $4000 \geq P_G \geq 1000$ and $400 \geq T_G \geq 150$ [where $P_G$ represents pressure (kg/cm²), $T_G$ represents temperature (°C), and $\gamma$ represents non-pulsation factor], while keeping the flow rate of the fluid in said tubular reactor within the range from 8 to 30 m/sec. without imposing flow pulses, the monomer conversion within the range of 35% or less, and the melt index of the resulting polymer within the range of 0.1 or more.

In short, the present invention is based on the finding that the imposed pulsation in flow is unnecessary from the viewpoint of flow characteristics of the reaction mixture when the temperature and pressure at any point in the entire reaction zone of a tubular reactor satisfy the formula given above and, in addition, other conditions such as flow rate, conversion, and melt index of the polymer formed are kept within the ranges specified above.

The conventional pulsation technique was developed with the object of physically discharging the reaction fluid from the reactor and not as the result of due consideration paid to the fundamental flow properties of the reaction fluid.

To the contrary, the method of this invention is based upon the finding that it is possible to predict whether the polymerization can be carried out smoothly and steadily or not under a given set of conditions, by referring to the aforesaid formula which was the result of analysis of various factors affecting the behavior of reaction mixture, such as flow characteristics of the reaction mixture, dimensional factors of the reactor, polymerization pressure, polymerization temperature, and concentration as well as mean molecular weight of the polymer formed, which are related to one another.

In a tubular reactor where polymerization is in progress according to a conventional procedure, the temperature and pressure defined by the aforesaid formula can be observed locally here and there, particularly in the region where the maximum temperature is registered. However, in a customary procedure, such temperature and pressure conditions have been established not throughout the entire reaction zone.

In the present process, it is necessary to maintain those temperature and pressure conditions which are herein specified throughout the entire reaction zone including the region near the outlet of the reactor, where the pressure is lower than in the region near the inlet, and the cooling region where the temperature is relatively lower than in other regions.

In the present method, the flow rate in the reactor should be selected from the range from 8 to 30 m/sec. The flow rate of the reaction fluid in the reactor is an important factor which affects thickness of the boundary layer for flow and heat transfer, and hence, the pressure drop and the resistance to heat transfer. A higher flow rate results in more decreased resistance to heat transfer, leading to increased heat removal through the reactor wall and hence, increased monomer conversion. A higher flow rate also favors dispersion of the initiator and hence, is effective in preventing abnormal reactions.

An increased flow rate, however, results in marked increase in the pressure drop and rapid decrease in the pressure particularly at the end of the reactor so that the specified pressure level becomes difficult to maintain, because the temperature has an upper limit beyond which decomposition reaction begins to take place. Adjustment of the pressure by means of an exit valve is effective only in a narrow range, the limits being imposed for economical and constructional reasons.

Consequently, an excessive increase in the flow rate is not always advantageous; the upper limit should be 30 m/sec. The lower limit of the flow rate should be 8 m/sec, because if the flow rate is decreased below 8 m/sec, the polymer build-up on the reactor wall increases undesirably and the state of flow becomes unfavorable for the dispersion of an initiator. The term "flow rate" as herein referred to means the volume of flow per unit time per unit sectional area of the reactor.

The reaction pressure and temperature should be selected from the range defined by the aforesaid formula. The reaction pressure should be in the range from 1,000 to 4,000 kg/cm$^2$, preferably from 1,200 to 3,500 kg/cm$^2$, throughout the entire reaction zone. The temperature should be in the range from 150° to 400° C., preferably from 160° to 350° C. When the pressure is below 1,000 kg/cm$^2$ or the temperature is below 150° C., it is meaningless to dispute about pros and cons of the flow pulses by referring to the aforesaid formula.

The pressure and temperature can be easily controlled in customary ways. For example, when the temperature becomes too low to remain in the range defined by the aforesaid formula while the pressure is kept constant at a predetermined level, it is easy to raise the temperature to a proper level by increasing the feed of initiator or by decreasing the rate of external cooling. When the temperature is kept constant at a predetermined level, the pressure can be adjusted by operating an exit valve of the reactor so that the polymerization conditions may meet the aforesaid formula.

Thus, the aforesaid formula enables the people skilled in the art to operate a tubular reactor continuously and steadily without imposing flow pulses, by properly adjusting the polymerization conditions so that the temperature and pressure throughout the entire reaction zone may remain in the range defined by the formula.

In the present invention, the reaction temperature and the rate of cooling of the reactor should be predetermined so that the conversion of monomer to polymer remains in the range of 35% or less, preferably from 15 to 30%. If the conversion is increased above 35%, the reaction fluid becomes too viscous because of a high concentration of the polymer in monomer gas phase. Such a high viscosity interferes with the fluid flow in the reactor and the flow pulsation becomes necessary even when the temperature and pressure meet the aforesaid formula.

Since the melt index of the polymer formed in the reactor has a great effect on the viscosity of the reaction fluid, it should be in the range of 0.1 or more, preferably from 0.1 to 50. If the melt index of the polymer formed in the reactor is below 0.1, the fluid flow in the reactor is interfered and the flow pulsation becomes necessary even if the temperature and pressure meet the aforesaid formula.

The melt index in the present invention is measured in accordance with the testing method of JIS K 6760.

Regulation of the melt index can be effected in a customary way by the addition of a chain transfer agent to the polymerization system. The suitable chain transfer agents are those which are customarily used in the production of polyethylene, such as, for example, hydrogen, methane, ethane, propane, propylene, n-butane, isobutane, butene-1, isobutene, and butene-2. These can be used each alone or in combination of two or more.

The well known initiators can be used, such as organic peroxides including di-tert-butyl peroxide, tert-butyl peroxybenzoate, lauroyl peroxide, acetyl peroxide, tert-butyl hydroperoxide, and the like; oxygen; or azo compounds including azobisisobutyronitrile, and the like.

The present process is not limited to homopolymerization of ethylene. It is applicable as well to the copolymerization in tubular reactor of ethylene with one or more comonomers, such as vinyl compounds including vinyl acetate, vinyl chloride, methyl or ethyl acrylate, methyl or ethyl methacrylate, acrylamide, vinyl ethers, dicarbonates, and the like.

The tubular reactor suitable for use in the present invention has an inner diameter of ¾ inch or more and L/D (length to diameter ratio) of 10,000 or more, preferably 10,000 to 100,000.

The present invention is illustrated in more detail below with reference to examples, but the scope of the invention is not limited to the examples.

COMPARATIVE EXAMPLE 1

A mixture of 100 parts by weight of ethylene and 0.00015 part by weight of oxygen, which had been compressed in a usual manner to 2,000 kg/cm$^2$ and heated at 170° C., was introduced into the first reaction zone (L/D=10.6×10$^3$) of a tubular reactor (L/D=1.5×10$^4$). The flow rate in the first reaction zone was 8 m/sec.

After the reaction mixture had attained a maximum temperature of 260° C., the reactor was cooled externally with Dowtherm of 140° C. to cool the reaction fluid to 230° C. The reaction mixture was then introduced into the second reaction zone (L/D=4.4×10$^3$) and fed with 0.0005 part by weight of tert-butyl peroxide for 100 parts by weight of ethylene feed. After the reaction fluid had attained a maximum temperature of 260° C., the reactor was cooled to cool the reaction fluid at the outlet of the reactor to 210° C. The polymerization was carried out without imposing flow pulses. The pressure in the reactor at the begining of polymerization was 1,300 kg/cm$^2$. The difference between the pressures at the inlet and outlet of the reactor increased at a rate of 300 kg/cm$^2$/hr and steady operation of the reactor was difficult to attain. Ethane was used as chain transfer agent. The melt index of the polymer obtained was 2.0, and ethylene conversion was 10%. The nonpulsation factor at the exit of the reactor was 1720, that is, $\gamma < 1850$.

EXAMPLE 1

In a manner similar to that in Comparative Example 1, a mixture of ethylene and oxygen was introduced into the first reaction zone of a reactor. After the reaction mixture had attained the maximum temperature of 300° C., it was cooled to 260° C. and introduced into the second reaction zone. tert-Butyl peroxide was fed to the second zone to increase the reaction temperature to 300° C. Thereafter the reaction mixture was cooled so as to reach the exit at 240° C. and a pressure of 1400 kg/cm². The polymerization was carried out in steady state without imposing flow pulses and no increase in pressure difference was noticed between the inlet and outlet. All of the non-pulsation factors measured at various spots in the reactor satisfied the inequality $\gamma \geq 1880$.

After about ten hours of continuous and steady running, no increase in the pressure difference was observed. The ethylene conversion was 14%. The polymer obtained had a melt index of 2.0, and a density of 0.92, and was of uniform quality.

COMPARATIVE EXAMPLE 2

A mixture of 100 parts by weight of ethylene and 0.00084 part by weight of tert-butyl peroxybenzoate, which had been compressed in a usual way to 2,000 kg/cm² and heated at 170° C., was introduced at a flow rate of 8 m/sec into the first reaction zone (L/D=5.6×10³) of a tubular reactor (L/D=1.5×10⁴). After the reaction mixture had attained the maximum temperature of 250° C., it was cooled to 220° C. and introduced into the second reaction zone (L/D=4.4×10³). To the reaction mixture, was further fed 0.0005 part by weight of tert-butyl peroxybenzoate to increase the temperature to 250° C. and then cooled to 220° C. The mixture was introduced into the third reaction zone where it was fed again with 0.0005 part by weight of the same initiator. After the reaction mixture had attained the maximum temperature of 250° C., it was cooled to 220° C. The pressure at the exit of the reactor was 1,350 kg/cm² at the beginning of the polymerization. The polymerization without pulsation was carried out. The pressure at the exit decreased at a rate of 250 kg/cm²/hr, increasing the pressure difference more and more between the inlet and the exit, and it was impossible to carry out the polymerization in steady state. Ethylene conversion was 12%. Ethane had been used as chain transfer agent, and the polymer formed had a melt index of 7.0. The non-pulsation factor ($\gamma$) was 1790.

EXAMPLE 2

In the same manner as in Comparative Example 2, ethylene and di-tert-butyl peroxide as initiator were introduced into the first reaction zone. After the maximum reaction temperature of 300° C. was attained, the reaction mixture was cooled to 260° C. Thereafter the reaction mixture was introduced successively into the second and the third reaction zones where it was further fed with di-tert-butyl peroxide in the same amount as in Comparative Example 2. After the temperature had risen to 300° C., the reaction mixture was cooled to 260° C. The pressure at the exit of the reactor became 1,450 kg/cm². Polymerization was carried out without imposing flow pulses and no increase in the pressure difference between the inlet and outlet of the reactor was observed, indicating steady progress of the polymerization. Ethylene conversion was 23%. The polymer formed had a melt index of 7.0. Non-pulsation factors satisfied the inequality $\gamma \geq 1970$ throughout the entire reaction zone.

What is claimed is:

1. A continuous process for producing polyethylene or copolymers of ethylene with other copolymerizable compounds by polymerizing or copolymerizing ethylene or ethylene and a compound copolymerizable with ethylene in the presence of an initiator in a tubular reactor, which process comprises maintaining the temperature and pressure at any point in the entire reaction zone within a definite range so as to meet the relations expressed by the formula, $$\gamma = P_G + 2T_G \geq 1850,$$

provided that $4000 \geq P_G \geq 1000$ and $400 \geq T_G \geq 150$, wherein $P_G$ represents pressure (kg/cm²), $T_G$ represents temperature (°C), and $\gamma$ represents non-pulsation factor, while keeping the flow rate of the fluid in said tubular reactor within the range from 8 to 30 m/sec without imposing flow pulses, the monomer conversion within the range of 35% by weight or less and the melt index of the resulting polymer within the range of 0.1 or more.

2. A process according to claim 1, wherein inner diameter of the tubular reactor is ¾ inch or more and L/D (length to inner diameter ratio) is 10,000 or more.

3. A process according to claim 1, wherein the compound copolymerizable with ethylene is vinyl acetate, vinyl chloride, methyl acrylate, ethyl acrylate, methyl methacrylate, ethyl methacrylate, acrylamide, or vinyl ethers.

4. A process according to claim 1, wherein the initiator is di-tert-butyl peroxide, tert-butyl peroxybenzoate, lauroyl peroxide, acetyl peroxide, tert-butyl hydroperoxide, oxygen or azobisisobutyronitrile.

* * * * *